Nov. 12, 1968

S. HANSEN 3,409,993

PRECISION TILT METER

Filed Jan. 10, 1966

INVENTOR.
SIEGFRIED HANSEN,
BY Walter R. Thiel
ATTORNEY.

INVENTOR.
SIEGFRIED HANSEN,
BY
Walter R. Thiel
ATTORNEY.

United States Patent Office 3,409,993
Patented Nov. 12, 1968

3,409,993
PRECISION TILT METER
Siegfried Hansen, Los Angeles, Calif., assignor to Hughes Aircraft Company, Culver City, Calif., a corporation of Delaware
Filed Jan. 10, 1966, Ser. No. 519,673
7 Claims. (Cl. 33—211)

ABSTRACT OF THE DISCLOSURE

A flat plate having a bubble chamber thereunder. A viscous liquid is placed in the bubble chamber in such volume as to leave a bubble under the flat plate, which bubble does not contact the bottom of the chamber. The bubble chamber also has electrical bubble detectors so that as the bubble moves from a null position in the bubble chamber, in response to tilt of the flat plate, a continuous electric signal is emitted. This signal in turn is transmitted to releveling means which tilts the flat plate so that the bubble returns toward its null position. The signal which relevels, or the releveling action can be used as a signal indicating the amount of tilt. The preferred releveling means is a resilient support for the flat plate, together with a pneumatic source which changes the inclination of the flat plate by varying the pressures within the several parts of the resilient support.

Background

The present invention relates to a system for maintaining a surface or plane substantially parallel to a horizontal reference plane and more particularly to a system which is adaptable to indicate the tilt of geologic faults and rock formations of the earth.

The increasing stress on a geological fault prior to an earthquake is indicated by the slowly increasing tilts of the rock formation in the vicinity of the fault. It has been surmised that there may be an increased rate of change of tilt just before an earthquake occurs; and if true, this would serve as a way of predicting earth quakes. The existing data are rather meager and have been obtained from instruments of doubtful stability. Therefore, a need exists for an accurate tilt measuring instrument which could implement a program to test the predicted hypothesis.

In round numbers, such an instrument should have a full scale range of ±1 second of arc and a resolution of 0.001 second. In principle, the instrument measures the departure from parallelism of two reference planes, one of which is attached to the local bedrock and the other of which is maintained level to within 0.001 second by means which are a part of the instrument. It is to the establishment of this precise reference plane that this invention is directed.

Bubble levels exist in two types, those with tubular vials and those with circular vials. The circular type of level can detect tilts in any direction, and its sensitivity depends on the radius of curvature of the cover glass. For a given angle of tilt, the indication will be equal to the angle in radians multiplied by the radius of curvature. It would appear then that it is only necessary to increase this radius to attain any desired sensitivity.

It must be noted that the indication discussed above is the final equilibrium value which is not attained immediately. The motion of the bubble is associated with viscous flow of the liquid which implies that the velocity is proportional to the force. In the case of a spherical cover glass, the force will be proportional to the distance from the equilibrium point. This leads to the well known solution that the bubble approaches its final position exponentially; characterized by some time constant. This time constant will increase as the radius of curvature is increased and soon becomes impractically long. In the limit, the sensitivity can be made infinite by using a flat cover glass, but at the same time the time constant becomes infinite.

The use of a flat cover plate can be made practical by adopting a somewhat different approach to the problem. It will be noted that the force on the bubble depends linearly on the tilt of the plate and is independent of the position of the bubble. Since the flow is viscous, the velocity of the bubble will be linearly proportional to the force and hence to the tilt angle. Therefore, it is bubble velocity rather than position which now becomes the measure of tilt. The criterion of a level plate then is simply that the bubble be stationary.

The above discussion assumes highly ideal conditions and ignores certain factors which become significant in a very sensitive instrument. If the glass is not perfectly flat, but has a minute waviness, the bubble will find a series of potential minima in which it will be lightly trapped. This will mean that a finite tilt is required before motion begins, and hence sets a limit on resolution.

It has also been assumed that surface tension is constant over the entire plate and that, therefore, the surface tension forces are accurately balanced to zero. This will not generally be true, and the variation of surface tension will make a contribution to the wavy potential pattern.

Therefore, an object of the present invention is to provide a relatively simple improved system for maintaining a surface or plane substantially parallel to a horizontal reference plane.

Another object of the present invention is to provide an improved precision tilt meter having an increased sensitivity and improved resolution.

A further object of the present invention is to provide an improved tilt meter which utilizes a simple bubble level technique in combination with a servosystem to maintain a surface level to a high degree of precision.

Briefly, the preferred embodiment of the present invention includes the combination of a flat plate defining the upper surface of a bubble level sensor with a servosystem which is constructed to tilt the plate so as to cause the bubble to approach a null position and maintain the plate in a substantially level attitude.

These and other objects and advantages of this invention will become apaprent from the following description taken in accordance with the specification and considered in conjunction with the accompanying drawings throughout which like reference characters indicate like parts.

Description

Figure 1:
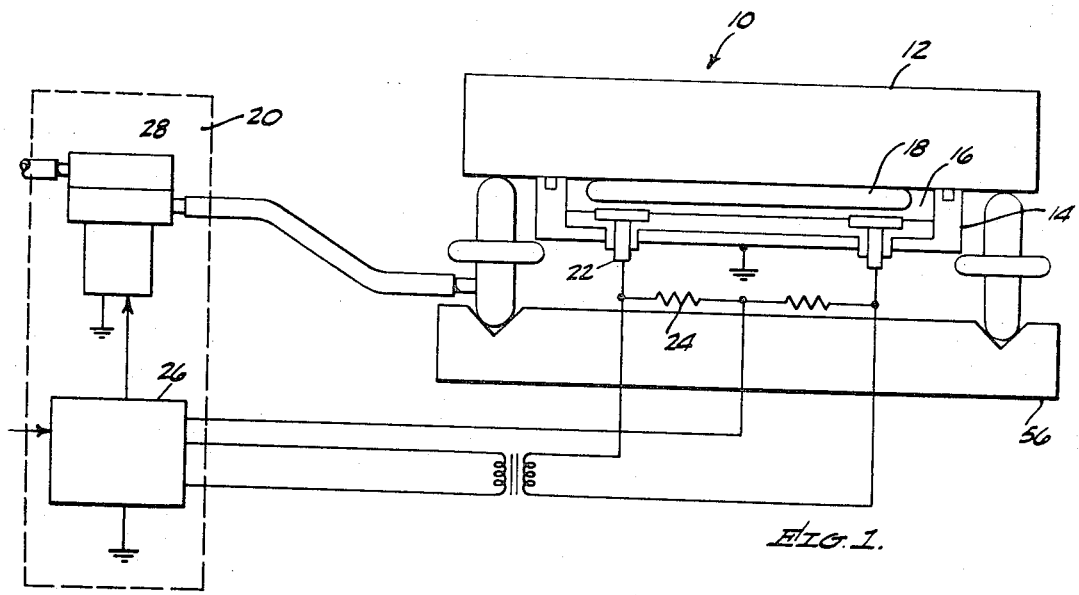
FIGURE 1 is a diagrammatical drawing of the improved precision tilt meter of a preferred embodiment of the present invention showing the unique structure of the bubble level sensor in detail and the conventional components of the servosystem in block form.

Referring now to FIGURE 1, the basic concept of the improved precision tilt meter of the present invention is clearly illustrated by this figure. This tilt meter includes a bubble level sensor 10 comprising a flat plate 12 having attached to it by conventional means such as an epoxy bonding agent a flat pan 14 which together with one surface of the plate 12 forms a bubble chamber 16. The bubble chamber is filled with a liquid such as ethyl alcohol in sufficient volume to substantially fill the chamber but allowing enough space for the creation of a substantially flat bubble 18.

The bubble level sensor is integrated into a servosystem 20 by positioning four orthogonally oriented electrodes 22 near the bottom of the chamber 16. Each opposing pair of the electrodes 22 is coupled through a conventional bridge circuit 24 to a controller unit 26 of the servosystem 20 which in turn is coupled to an electropneumatic transmitter 28 and an extensor system 30 on which the flat plate 12 is supported. Thus, by sensing changes in position of the bubble 18 within the chamber 16 resulting from the tilt of the flat plate 12, the servosystem 20 functions to compare the output of the sensors with a reference and to operate the extensor system 30 to level the flat plate 12 when a discrepancy is noted by the controller 26.

Figure 2:
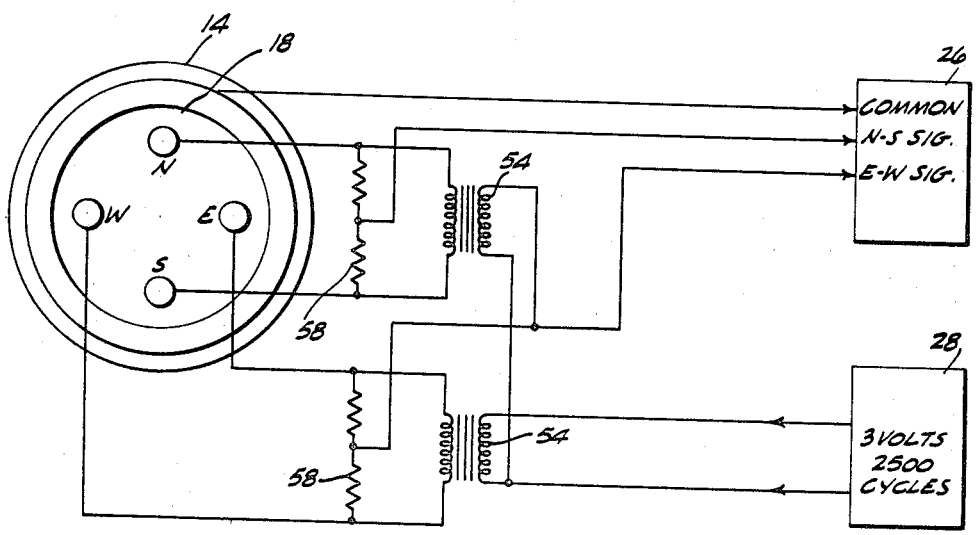
FIG. 2 is a schematic drawing illustrating the electrolytic sensors and the null balancing circuit utilized in the preferred embodiment.
Figure 3:
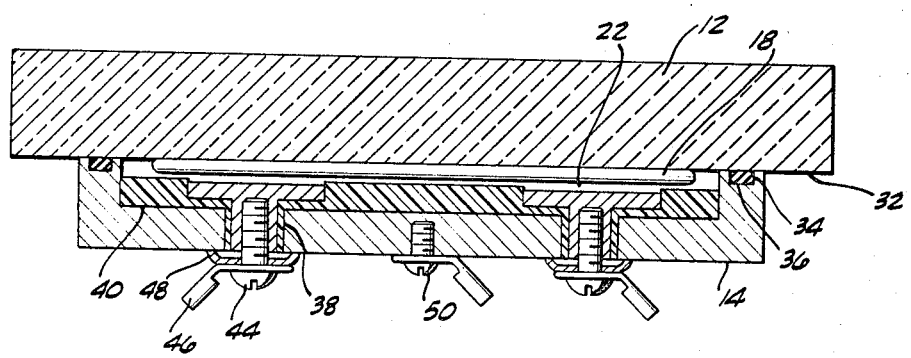
FIG. 3 is a side view of the flat plate and electrodes showing more closely the unique structure of the bubble level sensor.
Figure 4:
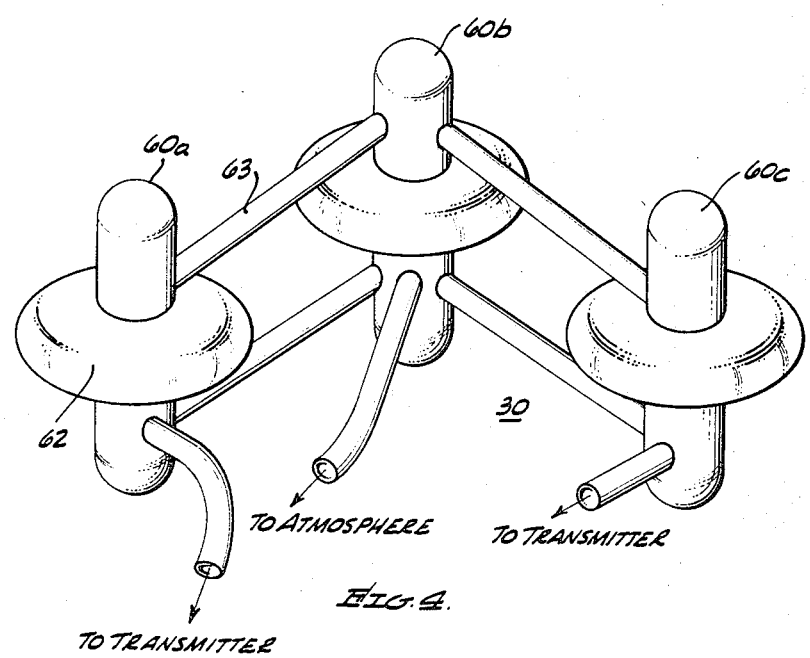
FIG. 4 is a perspective view of the extendible support structure of the preferred embodiment of the present invention.

While it is possible to integrate the bubble level sensor 10 into a number of different servosystems, for clarity and completeness of description a preferred embodiment of a bubble level sensor and servosystem is shown in FIGS. 2, 3 and 4.

Referring now to FIG. 3, there are shown two of the four orthogonally oriented electrodes 22 such as the north and south electrodes (N–S) and their positioning in the pan 14 relative to the flat bubble 18 and the plate 12. In this regard, it should be understood that as shown schematically in FIG. 2 the sensor 10 includes two other electrodes which for continuity would be called the east and west electrodes (E–W).

In the preferred embodiment the flat plate 12 is a quartz or glass plate having one surface 32 ground optically flat such as flat to one micro-inch and has had applied to it a fine grind such as that produced by two-three minutes of grinding with a grit such as an 1800 Carborundum grit. By applying the fine grind to the optically flat surface 32 the polish of the plate is removed without the removal of additional material. By this method the contour is kept flat but the surface is roughened enough to cause it to operate as a wick to keep the rim of the bubble wet. This improves the sensitivity of the sensor by substantially eliminating the increased threshold force necessary to overcome the sticking caused by a minute film of impurities left by the evaporation of the alcohol at the edge of the bubble.

Attached to the quartz plate 12 is a container or pan 14 constructed of an electrical conductive material such as aluminum having a peripheral slot 34 in one edge thereof of sufficient depth to contain an O-ring seal 36 for sealing the surface of the pan at the point of attachment to the quartz plate 12. Extending through the bottom of the pan 14 are a plurality of apertures which are of sufficient diameter to receive a sleeve 38, which may be a portion of a disc member 40 positioned in the bottom of the chamber 16. The disc 40 and sleeve 38 are of an electrical insulating material such as Teflon.

Inserted into each of the apertures is the electrode 22 of a material such as stainless steel and each of the electrodes has attached to it a conventional device for coupling the electrode into an electric circuit, such as a screw 44 and ring type contact 46 to which an electrical conductor is affixed by crimping or soldering. To electrically insulate the contact 46 and screw 44, a washer 48 of material such as Teflon is positioned between the contact 46 and the pan 14. Connected to the bottom of the pan is an additional screw and contact 50 which typically form the ground side of the electrical bridge circuit 24 (FIG. 2).

The method utilized by the preferred embodiment of sensing the bubble position makes use of the relatively high electrical conductivity of the ethyl alcohol in which the bubble is formed. If desired, this conductivity may be enhanced by adding additional conductive material to the ethyl alcohol such as sodium fluoride to develop between each electrode 22 and the stainless steel ring 42 a resistance of approximately 50,000 ohms. By this method the electrodes 22 sense the variation of resistance as the bubble 18 moves from its central position in the chamber 16 and develop aprpopriate signals which are supplied to the controller 26 (FIG. 1).

FIG. 2 depicts one electrical circuit which may be used with the resistance sensor of FIG. 3. The electro-pneumatic transmitter 28 shown in FIG. 1 may be the conventional two electro-pneumatic transmitters such as manufactured and sold by the Moore Products Company, Spring House, Pennsylvania. These transmitters provide an accurately proportioned air pressure in the range of 3–15 p.s.i.g. in response to an electrical input of 1–5 millivolts, and produce a regulated source electrical power such as 3 volts at 2500 cycles. This voltage is applied to the electrode pairs 22 through a one-to-one isolation transformer 54 of conventional construction which for convenience may be mounted on a base 56 (FIG. 1) close to the electrodes 22. A pair of resistors 58 which may be 1500 ohms each complete a conventional null bridge circuit and also serve to damp induced oscillations of the transformer secondaries. The 2500 cycle output from the bridged circuits is coupled to a pair of conventional high gain AC amplifiers (not shown) and a conventional synchronous chopper (not shown) comprising a portion of the controller 26. The DC signal output from the chopper then operates the electro-pneumatic transmitter 28 which sends a proportioned pressure pulse to the extensor system 30 (FIG. 1).

Shown in FIG. 4 is the extensor system 30 of the preferred embodiment. This system is a basic pneumatic extensor comprising a plurality of quartz tubes 60a, 60b and 60c each having a single convolution quartz bellows 62. The bellows have been constructed of quartz to minimize the effect of ambient temperature variations which could produce differential expansions of the extensors, thus impairing the accuracy of the tilt measurement. In a system where a quantitative output is not required the bellows may be constructed of other materials such as aluminum and comprise several convolutions. The material and number of convolutions being dictated by other physical properties of the tilt meter such as the weight of the platform. The geometry of the pneumatic extensors system is such that three tubes or capsules comprise the system each lying on the corners of a 45° right triangle with two capsules 60a, 60c each connected to one of the transmitters 28 and the third capsule 60b acting to provide temperature compensation. The reference pressure of the transmitter 28 is the ambient atmospheric pressure and thus the center capsule 60b, at the apex of the isosceles right triangle is not connected to the transmitter but rather is open to atmospheric pressure.

To prevent excessive friction between the bottom end of extensor system 30 with base 56, and between the top of extensor system 30 with the bottom of plate 32, the quartz plate 12 the extensor capsules are joined by a plurality of rods of fused quartz 63 to make a self-supporting assembly. This assembly can be positioned accurately on the base plate 56 without over-constraint by a system of V-grooves (FIG. 1). The qaurtz plate 12 is not grooved but simply rests on top of the three capsules. Approximate centering of the plate is provided by the bubble pan which rests between the capsules.

In the preferred embodiment the output pressure of the electro-pneumatic transmitter 28 has been chosen to be positive with respect to the atmospheric pressure in capsule 60b. For a typical operation of the tilt meter the initial leveling is achieved by adjustment of micrometers which are attached to the base 56 (not shown). This leveling is done in such a way that the pressure in the west and south capsules 60a and 60c, respectively, is approximately 9 p.s.i.g. while the common capsule 60b is at atmospheric pressure. Tilts of the base will then be recorded in terms of departure from the initial 9 p.s.i.g. setting. This recording of pressure can be done electrically since the transmitter 28 provides a proportional high level electrical signal which may be coupled to any one of a variety of conventional electrical recording devices (not shown).

While the basic principle of this invention has been herein illustrated along with one embodiment it will be appreciated by those skilled in the art that variations in the disclosed arrangement both as to its details and as to the organization of such details may be made without departing from the spirit and scope thereof.

What is claimed is:

1. A horizontal platform system comprising:
a platform;
support means for said platform;
means sensitive to the tilting of said platform for developing an electrical output signal representative of the deviation of the platform from a horizontal reference plane;
said means sensitive to tilting of said platform comprising a bubble level sensor including a flat plate and a container secured to the bottom of said plate, said container together with one surface of said plate defining a liquid space below said plate, a bubble formed in an electrically conductive viscous liquid within said space against said one surface of said flat plate, said liquid space having sufficient height that the bubble does not contact the bottom of the liquid space, a plurality of electrodes in said container, said sensor being adapted to develop a continuous electrical output signal representative of the displacement imparted to said bubble as said platform tilts.

2. The horizontal platform system of claim 1 wherein the means coupled to the means sensitive to tilting of said platform are extensible means and a servosystem adapted to receive said electrical output system to deliver to said extensible means an input signal in response thereto.

3. The horizontal platform system of claim 2 wherein the servosystem includes a pair of electro-pneumatic transmitters and the extensible means comprises a pair of extensible supports each coupled to a differing one of said transmitters and adapted to receive variations in pressure from said transmitter in response to said electrical output signals.

4. A precision tilt meter comprising:
a flat plate;
a support means for said flat plate;
means sensitive to the tilting of said plate for developing a continuous electrical output signal representative of the deviation of the plate from a horizontal reference plane, said means sensitive to tilting comprising a container secured to the bottom of said plate, said container together with one surface of said plate defining a liquid space below said plate, a viscous liquid in said liquid space incompletely filling said liquid space to leave a bubble therein against said one surface of said plate, said liquid space having sufficient height that the bubble does not contact the bottom of the liquid space, a plurality of electrodes extending through said container for sensing variation of resistance as said bubble moves; and
means coupled to said means sensitive to the tilting of said plate for receiving said output signal and for maintaining said platform substantially parallel to said horizontal reference plane.

5. The precision tilt meter of claim 4 wherein said viscous liquid is adapted to conduct electric current and wherein said plurality of electrodes are positioned in the bottom of said container, each of said electrodes being coupled to a balancing circuit and adapted to develop an electrical output signal representative of the displacement imparted to said bubble as said flat plate tilts.

6. The precision tilt meter of claim 5 wherein said flat plate has its bottom surface ground optically flat with a fine grind finish.

7. The precision tilt meter of claim 5 wherein the means coupled to said means sensitive to the tilting of said plate is a servosystem, including a pair of electro-pneumatic transmitters and the extensible means comprises a pair of extensible supports each coupled to a differing one of said transmitters and adapted to change length in response to variations in pressure from said transmitter.

References Cited

UNITED STATES PATENTS

| | | | |
|---|---|---|---|
| 2,713,727 | 7/1955 | Balsam | 33—211 |
| 2,804,118 | 8/1957 | Bayerkohler | 254—93 |
| 2,926,530 | 3/1960 | Mueller | 33—206.5 XR |
| 3,020,506 | 2/1962 | Remington et al. | 338—86 |
| 3,036,844 | 5/1962 | Vogel | 248—400 |
| 3,051,007 | 8/1962 | Remington | 74—5.47 |
| 3,269,685 | 8/1966 | Wallace | 248—371 XR |
| 3,289,475 | 12/1966 | Kenyon | 33—225 XR |

LEONARD FORMAN, *Primary Examiner.*

L. ANDERSON, *Assistant Examiner.*